(12) United States Patent
Normann et al.

(10) Patent No.: US 6,972,671 B2
(45) Date of Patent: Dec. 6, 2005

(54) DEVICE MOUNTED ON VEHICLES WITH PNEUMATIC-TIRED WHEELS, FOR USE IN A TIRE PRESSURE MONITORING SYSTEM

(75) Inventors: Norbert Normann, Niefern-öschelbronn (DE); Gunter Lothar Schulze, Ispringen (DE)

(73) Assignee: BERU Aktiengesellschaft, Ludwigsburg (DE)

( * ) Notice: Subject to any disclaimer, the term of this patent is extended or adjusted under 35 U.S.C. 154(b) by 1 day.

(21) Appl. No.: 10/239,537

(22) PCT Filed: Feb. 3, 2001

(86) PCT No.: PCT/EP01/01175

§ 371 (c)(1), (2), (4) Date: Jun. 6, 2003

(87) PCT Pub. No.: WO01/70520

PCT Pub. Date: Sep. 27, 2001

(65) Prior Publication Data

US 2004/0055370 A1    Mar. 25, 2004

(30) Foreign Application Priority Data

Mar. 22, 2000  (DE) ................................. 100 14 949

(51) Int. Cl.⁷ ............................................. B60C 23/00
(52) U.S. Cl. ....................................... 340/442; 73/146
(58) Field of Search ............................... 340/442–449; 73/146, 146.5; 116/34 R

(56) References Cited

U.S. PATENT DOCUMENTS 5,663,496 A    9/1997  Handfield et al.

(Continued)

FOREIGN PATENT DOCUMENTS

DE    19518806    11/1996

(Continued)

*Primary Examiner*—Jeffery Hofsass
*Assistant Examiner*—Eric Blount

(57) ABSTRACT

There is described an arrangement on vehicles equipped with wheels (1) with pneumatic tires, having an evaluation and control unit (8) arranged in the vehicle (2) and one or more receiving antennas (4), that are assigned to individual wheels (1) or groups of wheels (1) of the vehicle (2) and are connected to the evaluation and control unit (8) via an RF receiver (5) comprising a demodulator (6), for use in a tire-pressure monitoring system in which a unit (3), that is mounted on the respective wheel (1) and that comprises a pressure sensor for measuring the pressure in the pneumatic tire and for generating an electric pressure-measurement signal, comprises a control circuit and a transmitter with a sending antenna for sending out, under the control of the control circuit, the pressure-measuring signal or a signal derived therefrom in the form of a radio-frequency signal.

The invention provides that each receiving antenna (4) has assigned to it a separate RF receiver (5) in combination with a demodulator (6), a circuit arrangement (7) for the generation of a digital electric identification signal characteristic of the mounting location of the respective receiving antenna (4), and a BUS interface (19), that the evaluation and control unit (8) comprises a BUS interface (18), that the two BUS interfaces (18, 19) are connected one to the other by a BUS (17), for which purpose a plug-in connector (21) is provided which is connected to the BUS (17) by a first connector element (22) and to the BUS interface (19) of the RF receiver (5) by a second connector element (23), and that the first connector element (22) of the plug-in connector is designed so as to provide an identifier in electric/mechanical form and to supply it to the circuit arrangement (7) provided on the side of the RF receiver (5), through its connection to the second connector element (23), for generation of the digital electric identification signal characteristic of the identifier of the first connector element (22).

15 Claims, 3 Drawing Sheets

U.S. PATENT DOCUMENTS

| | | | | |
|---|---|---|---|---|
| 5,889,464 A | * | 3/1999 | Huang | 340/442 |
| 6,062,072 A | * | 5/2000 | Mock et al. | 73/146.5 |
| 6,362,731 B1 | * | 3/2002 | Lill | 340/445 |
| 6,591,671 B2 | * | 7/2003 | Brown | 73/146.5 |
| 2002/0116992 A1 | * | 8/2002 | Rickel | 73/146 |

FOREIGN PATENT DOCUMENTS

| | | |
|---|---|---|
| DE | 29621512 | 4/1997 |
| DE | 19856898 | 6/2000 |

* cited by examiner

DEVICE MOUNTED ON VEHICLES WITH PNEUMATIC-TIRED WHEELS, FOR USE IN A TIRE PRESSURE MONITORING SYSTEM

The present invention relates to an arrangement having the features indicated in the preamble of Claim 1. An arrangement of this kind is known from DE 195 18 806 A1, where it is disclosed to monitor the pressure in the tires of a vehicle by means of pressure sensors which latter are arranged, together with a battery-driven electronic measuring and control circuit, a transmitter and a sending antenna, on the respective wheel, especially on the valve or as one module with the valve of the wheel. Such a unit, being provided on the respective wheel, will be referred to hereafter as wheel-mounted electronic module. The electronic measuring and control circuit adds the respective identification signal to the electronic tire-pressure signals supplied by the pressure sensor in the respective wheel-mounted electronic module, which are then transformed to digital radio signals and transmitted by radio to a central receiving, evaluation and control unit, which latter is connected for this purpose to receiving antennas, each provided in the neighborhood of one of the wheels, especially on the wall of the wheel house of the vehicle body. The radio signals constitute a data telegram comprising, in digital form, a preamble, the identification signal, a signal containing the tire pressure or a value derived therefrom, and a postamble. The radio signals are radio-frequency signals. In Germany, radio-frequency transmission is effected in the 433 MHz range, known as ISM band, in some other countries in the 315 MHz range or the 868 MHz range. The radio signals sent out by the wheel-mounted electronic module are received by the receiving antennas provided for this purpose.

According to DE 195 18 806 A1, the receiving antennas transmit the RF signals via special lines, suited for transmitting RF signals, to the central receiving, evaluation and control unit where an RF receiver, provided with a separate receiving channel for each antenna, amplifies and demodulates the signal arriving at the input of the respective receiving channel. After demodulation, the LF signal then present is decoded and evaluated in order to provide the driver via the control module of the receiving, evaluation and control unit with a warning, if necessary, or some other information regarding the tire pressure.

Since the wheel-mounted electronic module is battery-driven and the battery is to have the longest possible service life, for example a service life of at least seven years, the wheel-mounted electronic module must operate with the least possible current consumption. Its radio signals are, consequently, very weak. Due to the low signal level, costly measures are required for the electric lines between the receiving antennas and the central receiving, evaluation and control unit in the system known from DE 195 18 806 A1 to protect the signals transmitted via those lines from external interference. In a practical example of a tire-pressure monitoring system according to DE 195 18 806 A1, the electric lines are twisted-pair cables that have been shielded in a costly way. The safety from interference achievable in this way is only imperfect and connected with considerable cost.

Now, it is the object of the present invention to indicate an approach for making the transmission of the signals more immune to noise, and this in a low-cost way. At the same time, it must however remain ensured that the central evaluation and control unit is capable of identifying from the signals transmitted to it the receiving antenna from which the respective signal has been obtained.

This object is achieved by an arrangement having the features defined in Claim 1. Advantageous further developments of the invention are the subject-matter of the subclaims.

Contrary to the prior art, the RF receiver and an evaluation and control unit according to the invention are no longer combined in one module that is arranged in the vehicle as a central unit and is connected to all receiving antennas. Instead, each receiving antenna now has assigned to it a separate RF receiver connected by a BUS to the evaluation and control unit which now can do without an RF receiver unit.

The invention is insofar of advantage as the BUS system, that transmits electric signals in digitized form, does not need any expensive shielded cables for transmission of such signals; rather, unshielded electric lines can now be used which are available at much lower cost than shielded cables. If the vehicle is already equipped with a BUS system, which is frequently the case today, then that BUS system can be used simultaneously for the purposes of the invention, it being only necessary that the RF receiver on the one hand and the evaluation and control unit on the other hand be connected with the existing BUS system, which can be achieved by only a few short or moderately long additional lines—depending on the spatial arrangement of the BUS system—that can be easily integrated into, and can be prefabricated and installed together with a cable harness anyway provided for the vehicle. An additional advantage lies in the fact that by assigning a separate RF receiver to each of the receiving antennas it is possible to minimize the interference susceptibility of the signal transmission process, since the respective receiving antenna and the RF receiver associated to it may be arranged one closely adjacent the other or may even be combined in a single module so that, contrary to the system disclosed in DE 195 18 806 A1, the RF signals need no longer be transmitted over longer transmission lines, but can be fed by the receiving antenna over the shortest possible distance directly into the RF receiver for being transformed into LF signals in a demodulator arranged downstream of the receiver, which LF signals are then decoded, digitized and brought into a signal shape suitable for the selected BUS system by a BUS interface.

The transmission of low-frequency signals, and especially of digital direct-current signals, is much less susceptible to interference than the transmission of RF signals via twisted-pair cables according to the system disclosed in DE 195 18 806 A1. The shortest possible line connection to the RF receiver helps render the signal transmission from the RF receiver to the evaluation and control unit less susceptible to interference especially in cases where the receiving antenna and its associated RF receiver are combined in a single module.

Suited as BUS system is any known BUS system, for example the CAN-BUS.

The RF receiver can be cheap since a single-channel RF receiver is needed only. The RF receivers must be supplied with current from the electric wiring of the vehicle. The voltage supply can be effected via a separate supply line from the electric wiring of the vehicle to the respective RF receiver. Preferably, however, instead of being effected via separate lines, the voltage supply is effected via the BUS system as such.

Contrary to the tire-pressure monitoring system known from DE 195 18 806 A1, when a BUS system according to the invention is used the evaluation and control unit is not in a position to determine the origin of the signal transmitted by a receiving antenna to the evaluation and control unit exclusively from the conductor arrangement between the receiving antennas and the evaluation and control unit. In order to permit that information to be gained by the evaluation and control unit, it is further proposed by the invention that a plug-in connector be arranged at the BUS interface associated to the respective receiving antenna, for connecting that interface to the BUS. The plug-in connector comprises two connector elements, namely a first connector element connected to the BUS and a second connector element connected to the BUS interface. According to the invention, the first connector element is designed so as to provide an identification in electric/mechanical form which, when the first connector element is connected to the second connector element, is transmitted to the circuit arrangement provided on the side of the RF receiver for generation of a digital electric identification signal characteristic of the identifier of the first connector element, which identifier is determined by the latter's particular structure. The identifier assigned to the first connector element of the plug-in connector is different for each mounting location of a receiving antenna. When the first connector element is connected with the second connector element, the identifier is transmitted to the circuit arrangement intended to generate a digital electric identification signal, whereupon that circuit arrangement generates a digital electric identification signal characteristic of the identifier of the first connector element, and adds that identification signal to the data telegram which the associated receiver has received by radio from the wheel-mounted electronic system. Each data telegram arriving in the central evaluation and control unit therefore contains an identification signal indicative of the receiving antenna from which the pressure-measuring signal contained in the data telegram has been received. By comparing the digital electric identification signal contained in the data telegram with the identifiers of all possible mounting locations of receiving antennas stored in the evaluation and control unit, the evaluation and control unit can then clearly identify the receiving antenna from which each data telegram has been received, provided the digital identification signal has been transmitted faultlessly as part of the data telegram. Otherwise, the data telegram can be rejected as defective.

The way of determining the receiving antenna from which a data telegram has been received, as proposed by the invention, offers considerable advantages:

The modules or units comprising each a receiving antenna, an RF receiver in combination with a demodulator, a circuit arrangement for generating an identification signal characteristic of the mounting location of the receiving antenna and a BUS interface may be identically designed without any distinguishing features This facilitates both production and storage. The modules become distinguishable for the evaluation and control unit only when these modules or units are installed at different mounting locations and when the plug-in connector is connected to the BUS by joining the two connector elements.

The coding characteristic of the mounting location is effected as part of the wiring work on the vehicle which is anyway necessary during the latter's production.

The BUS may be part of a cable harness that must be produced and installed anyway. It is already a standard requirement in connection with the installation of a cable harness that specific plug-in connectors must come to lie at specific mounting locations. To meet such a requirement also for plug-in connectors in connection with a tire-pressure monitoring system does not present any difficulty to a person skilled in cable harness technology so that it can be ensured without any difficulty that the "first" connector elements will be arranged in the correct mounting locations.

The evaluation and control unit may have stored in it not only the identifiers of the mounting locations, where the receiving antennas are actually installed, but also further mounting locations which are relevant only for model variants of the vehicle, or even mounting locations in trailers that are coupled only temporarily. For example, it would be imaginable in the case of a more expensive model variant to assign to each wheel a separate module comprising a receiving antenna, an RF receiver with demodulator, a circuit arrangement for generating an identification signal and a BUS interface. In the case of a cheaper model variant, a common module or unit could be assigned to the wheels arranged on one axle. In an even cheaper model variant, all wheels of a vehicle could be assigned a common centrally arranged module or unit. According to an additional variant, one can also imagine to couple a single-axle trailer, for example a caravan, whose wheels are to be monitored for tire pressure. According to a further variant, one could provide for connection of a two-axle trailer whose wheels are to be monitored for tire pressure with the aid of one or more such modules or units. A large number of variants for different mounting locations may be prestored in the central evaluation and control unit, in which case a separate identifier, different from the identifiers of all other possible mounting locations, may be assigned to and stored for each possible mounting location.

Different cable harnesses with differently coded "first" plug-in connector elements may be used for different model variants and equipment variants of the vehicle. The system according to the invention can thus be used with identical components or units, consisting of a receiving antenna, an RF receiver with demodulator, a circuit arrangement for the generation of an identification signal and a BUS interface and with identical evaluation and control units, for all model variants and equipment variants of the vehicle without any further adaptation, which is an extraordinary advantage in the assembly of vehicles and for repair and maintenance purposes.

If, for example, a trailer is to be allowed for, then the proper coding of the plug-in connector for that equipment variant can be made already on the occasion of the assembly of the trailer coupling device since it is anyway necessary to install an electric coupler for connection of a trailer when a trailer coupling device is being mounted.

According to the invention, the "first" connector element of the plug-in connector assigned to the mounting location of the respective receiving antenna is designed so as to provide an identifier in electric/mechanical form. This means that the first connector elements of the plug-in connectors differ one from the other in their mechanical structure and that, once a first connector element has been connected to a second connector element, such differences have an electric effect on the circuit arrangement for the generation of a digital electric identification signal provided at the end of the RF receiver so that the latter is caused to generate and to transmit a digital electric identification signal characteristic of the identifier of the first connector element. The structure of those digital identification signals is predetermined by the structure of the circuit arrangement.

The design of the circuit arrangement is selected so that a predetermined identification signal, characteristic of the respective mounting location, can be generated and transmitted for all possible mounting locations.

For connection to a BUS, the plug-in connector needs a number of contact pairs depending on the selected BUS structure. In order to be able to provide an electric/mechanical identifier determined by the particular mounting location of the receiving antenna, the plug-in connector is further preferably equipped with a plurality of additional contact pairs, each conveniently consisting of a contact pin and an associated jack, it being of no importance if the contact pins are arranged on the first connector element and the contact jacks are arranged on the second connector element of the plug-in connector, or vice versa. While the additional contact pins or contact pins or contact jacks are provided on the second connector element of the plug-in connector, and are connected to the circuit arrangement for generation of the digital electric identification signal, in identical fashion for all possible mounting locations, there do exist differences in the first connector element, depending on the envisaged mounting locations, with respect to the number and/or the arrangement of the additional contact pins or contact jacks and/or differences regarding their connection to an electric conductor of the electric wiring of the vehicle or to ground, and accordingly a different arrangement of the first connector element is selected for each possible mounting location. It would be possible, for example, to select from the additional contact pins or contact jacks provided in the first connector element of the plug-in connector two contact pins or contact jacks, different for each possible mounting location, and to connect one of such pins or jacks to ground and the other to an electric conductor. Depending on the two contact pins or jacks selected for that purpose, the circuit arrangement will then be controlled by the voltage supplied to it on different inputs and be caused to generate an identification signal determined by the selected connection of the additional contact pins or jacks to ground and voltage, respectively, which identification signal will then be added to each data telegram that is transmitted to the evaluation and control unit. It is thus possible to distinguish between $2^n$ mounting locations with a number n of additional contact pairs.

Although the "first" connector elements differ one from the other with respect to their contact assignment, they all fit onto the preferably equal "second" connector elements of the plug-in connectors, thus forming a family of connector elements that are identical as regards their basic structure but that differ one from the other with respect to the number and/or arrangement of the additional contacts and/or their assignment to voltage and ground, respectively. The assignment of the variants of the "first" connector elements to different mounting locations, thereby rendered possible, may remain the same for all vehicles of one model family and may be suited for all equipment variants of a model family.

Some advantageous exemplary embodiments of the invention will now be described with reference to the drawing in which.

Identical or corresponding parts are indicated in the different Figures by the same reference numerals.

Figure 1:
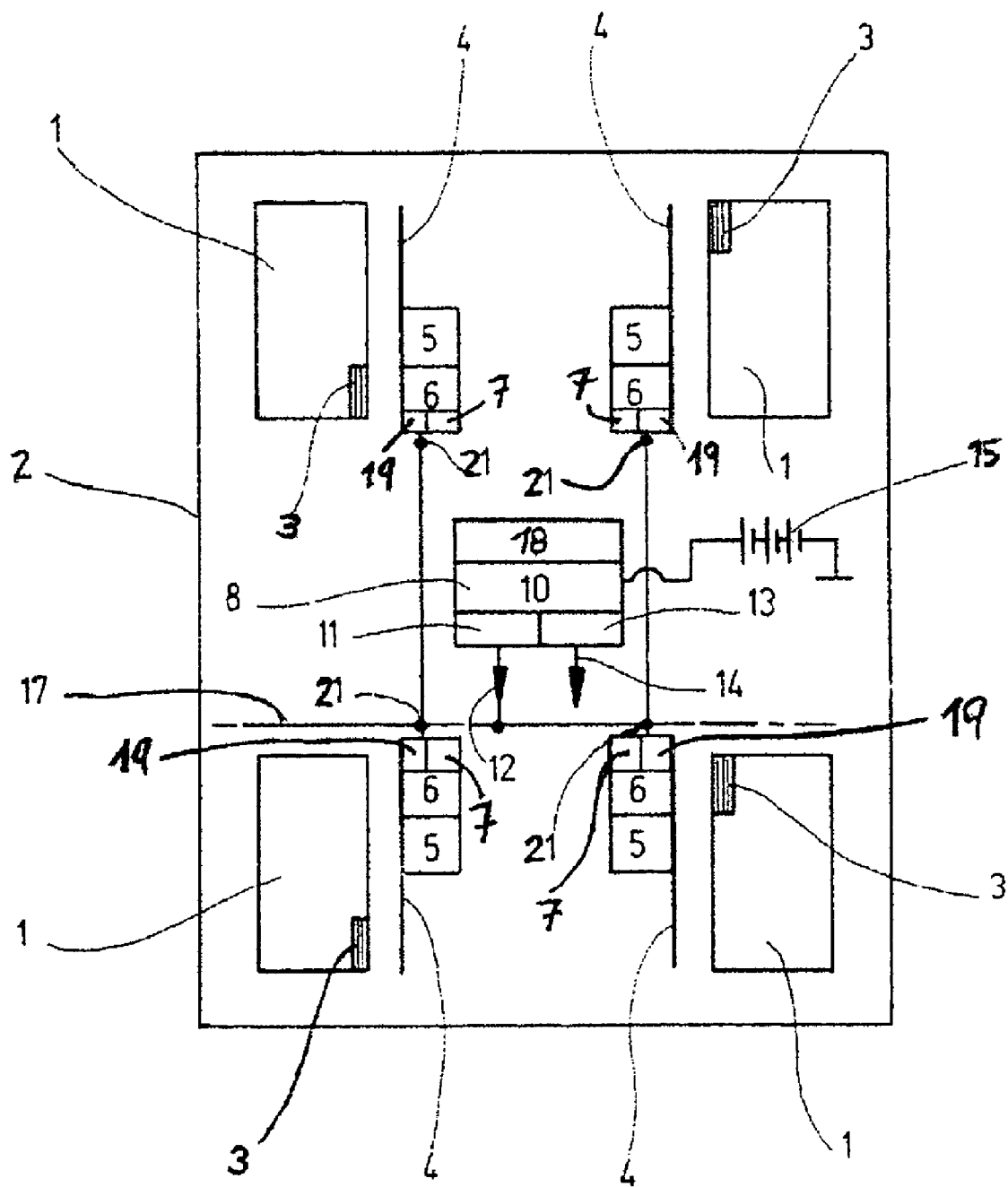
FIG. 1 shows a block diagram of the arrangement of the essential components of a tire-pressure monitoring system in a motor vehicle, using a BUS system installed in the vehicle.

FIG. 1 shows four wheels 1 of a vehicle 2, especially a motor vehicle, in diagrammatic representation. Mounted on each wheel 1 is a wheel-mounted electronic module 3. The wheel-mounted electronic modules 3 are identical one to the other and have the same mounted positions relative to the respective wheel 1. Each wheel-mounted electronic module 3 comprises (not shown in the drawing) an electric battery, a preferably piezoelectric pressure sensor with associated measuring and control electronics and a transmitter with RF stage that feeds a sending antenna. The transmitter sends out pressure signals, that have been picked up by the pressure sensor and processed by the measuring and control electronics, in the form of digital RF signals which additionally contain an identification signal characteristic of the respective wheel-mounted electronic module 3.

Neighboring each wheel 1, a receiving antenna 4 is provided in the wheel house of the body of the motor vehicle 2, in which the respective wheel is enclosed. Allocated to each receiving antenna 4 is a single-channel RF receiver 5 with a demodulator 6, a circuit arrangement 7 for generating an identification signal and a BUS interface 19, so as to form a unit 20 which is connected via a BUS 17 to a central evaluation and control unit 8 that may be located, for example, behind an instrument panel of the motor vehicle 1.

The evaluation and control unit 8 comprises a BUS interface 18 at the input, a microprocessor 10 for evaluation of the signals and for control tasks, a BUS driver 11 in a BUS interface 12 via which warning signals and other information regarding the tire pressure can be displayed on the instrument panel via the BUS 17, and signals for operation and setting of the evaluation and control unit can be transmitted. The evaluation and control unit 8 is further equipped with a driver 13 for a diagnosis interface 14. The evaluation and control unit 8 is supplied with voltage from the vehicle wiring, symbolized in the drawing by the connection between the evaluation and control unit 8 and a battery 15 of the motor vehicle. The voltage supply of the modules 20 is effected via the evaluation and control unit 8 and via lines of the BUS 17.

The tire-pressure monitoring system illustrated in FIG. 1 operates as follows:

The wheel-mounted electronic modules 3 send out signals comprising a data telegram having a preamble, an identification signal characteristic of the sending wheel-mounted electronic module 3, a measurement signal and a postamble. These RF signals are received by the antennas 4, are demodulated, decoded and supplemented by an identification signal generated in the circuit arrangement 7 and being characteristic of the mounting location of the respective receiving antenna 4, and are transmitted to the BUS interface 19 which latter comprises a BUS driver that generates the data protocol of the BUS system installed in the motor vehicle and sends the data telegram, received from the wheel-mounted electronic module 3, via the BUS 17 to the central evaluation and control unit 8, where it is received by the BUS interface 18 and is evaluated in the microprocessor 10. The microprocessor 10 compares the identification signal contained in the data telegram, which is characteristic of the mounting location of the respective receiving antenna 4, with the identifiers of all possible mounting locations of receiving antennas 4 that are stored in the microprocessor 10, and when a match is detected derives therefrom the receiving antenna 4 from which the transmitted data telegram originates.

Figure 2:
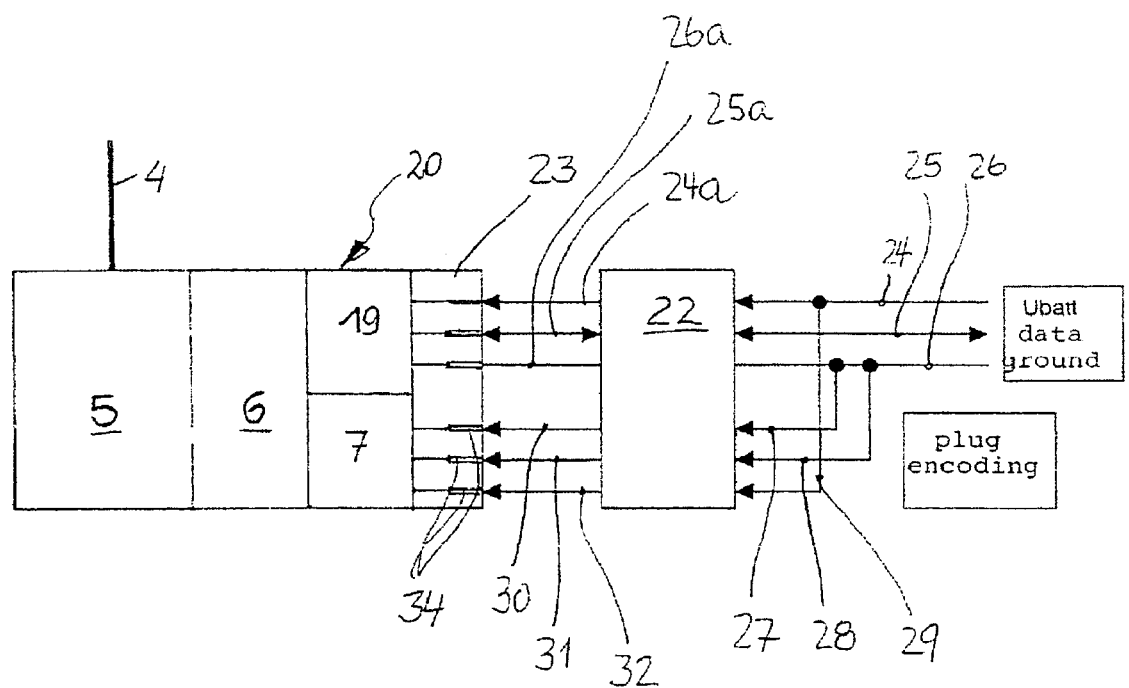
FIG. 2 shows a block diagram of an example of how to code the mounting location of a receiving antenna with the aid of a correspondingly coded plug-in connector.

The identification signal generated by the circuit arrangement 7 is different, depending on which plug-in connector 21, connecting the modules 20 to the BUS 17, is assigned to the mounting location of a selected receiving antenna 4. This will be explained hereafter with reference to FIG. 2, which shows a block diagram of one of the modules 20 comprising a receiving antenna 4, an RF receiver 5 with a demodulator 6, a circuit arrangement 7 for the generation of an identification signal and a BUS interface 19 with a BUS driver. For connecting the module 20 to the BUS 17, a plug-in connector 21 is provided that comprises a first connector element 22 in the form of a plug and a second connector element 23 in the form of a coupler arranged on the module 20. This plug-in connector 21 serves to transmit, via a first line 24 and an associated contact pin 24a, the necessary supply voltage U bat from the vehicle wiring via several data lines—of which only data line 25 is shown in the drawing—and data via a corresponding number of contact pins 25a, and to establish the necessary ground connection via a further line 26 and an associated contact pin 26a. Three additional lines 27, 28 and 29 serve to use three additional contact pins 30, 31, 32 of the plug 22 for encoding the mounting location; to this end, those contact pins 30, 31 and 32 are connected to ground and to the battery voltage U batt, respectively, in a manner characteristic of the respective mounting location. In the illustrated embodiment, the contact pins 30 and 31 are connected to ground while the contact pin 32 carries the battery voltage U batt over ground potential. The additional contact pins 30, 31 and 32 are fitted in correspondingly arranged contact jacks 34 of the coupler 23, which are connected to the circuit arrangement 7 and which control the latter, depending on the assignment of the contact pins 30, 31 and 32, so that it generates an identification signal characteristic of the assignment of the contact pins 30, 31 and 32, and then supplies such signal to the driver in the BUS interface 19 for addition to the data telegram which is then transmitted to the central evaluation and control unit 8 via the data lines 25.

Figure 3:
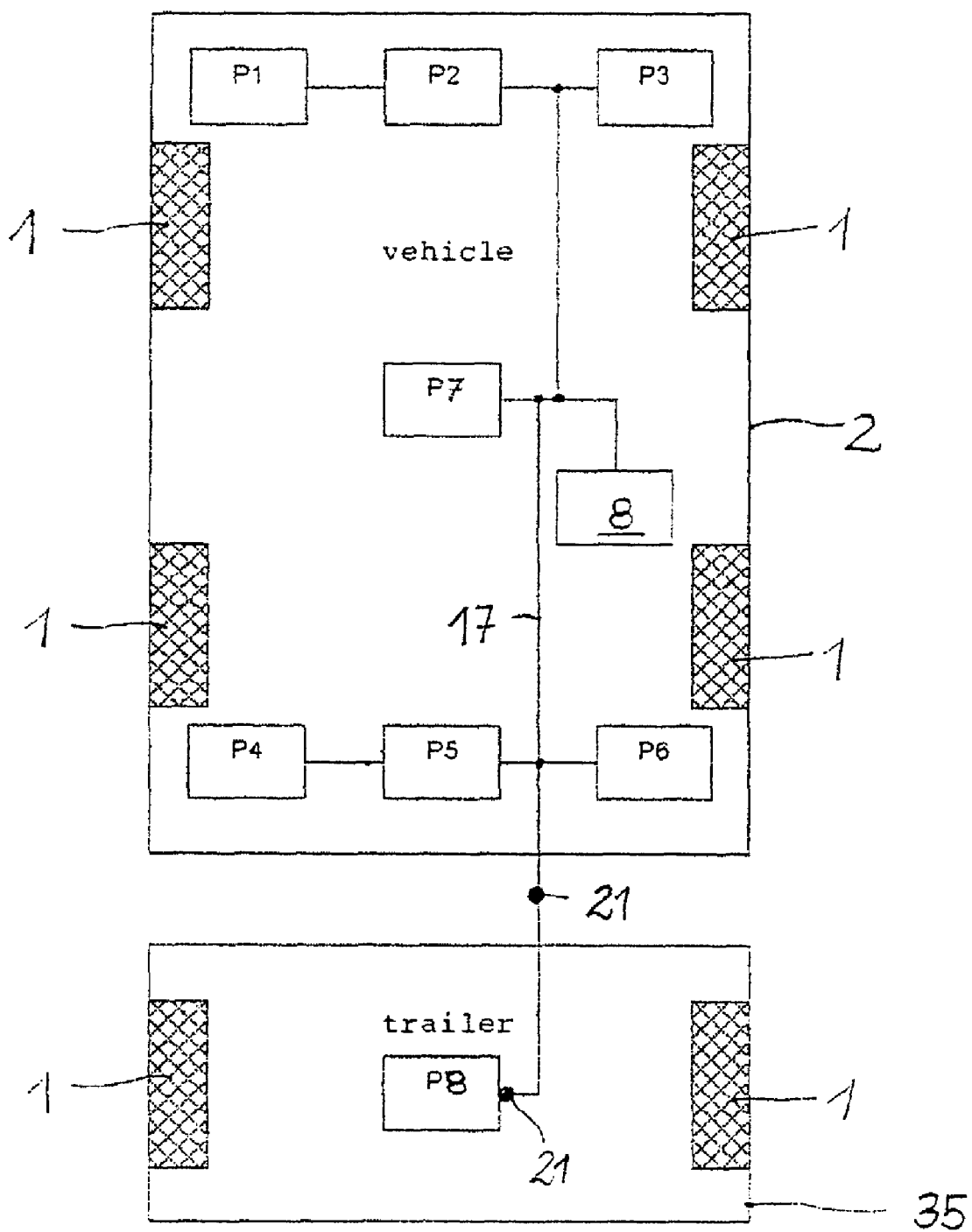
FIG. 3 shows, in a block diagram similar to that of FIG. 1 and by way of an example of a vehicle with trailer, how the invention proposes to prepare the system for different equipment variants in advance.

FIG. 3 shows a diagrammatic representation of a vehicle 2 with a single-axle trailer 35. Seven mounting locations P1 to P7 for receiving antennas are provided in the vehicle, an additional one P8 is provided on the trailer 35. Not all of the mounting locations P1 to P7 have assigned to them a receiving antenna 4 in combination with a module 20. In the case of an equipment variant of the kind illustrated in FIG. 1 only the mounting locations P1, P3, P4 and P6 are assigned in the described way. For a cheaper version it would be imaginable to assign only the mounting locations P2 (a common module 20 for the two front wheels) and the mounting location P5 (a common module 20 for the rear wheels). For an even cheaper embodiment it would be imaginable to assign a module 20 only to the mounting location P7, for example at a central point below the floor panel of the body. In the present case, only a single equipment variant is envisaged for the trailer 35, i.e. a single module 20 for the only two wheels 1 mounted on the single axle. It would, however, also be possible to assign a separate module 20 to each of the two wheels 1 of the trailer as well.

However, although the evaluation and control unit 8 knows the mounting locations P1 to P8 from which a data telegram arrives, it cannot tell from which of the wheels 1 the data telegram originates, for generally each receiving antenna 4 can receive signals from each of the wheels 1. In average, however, the receiving antenna 4 that is the closest to a given wheel 1 will receive the signals emitted by the electronic unit 3 mounted on that wheel with higher intensity (receiving amplitude), compared with signals emitted by the further remote electronic units mounted on the other wheels. By comparing the intensity of the signals received by a given receiving antenna 4, it can therefore be determined which of the wheel-mounted electronic units generates the highest signal intensity at a given receiving antenna 4 so that the signal intensity can be taken as an indicator of the vehicle wheel from which a specific signal originates. The process of carrying out such an intensity comparison and of using it for purposes of determining the wheel position, has been disclosed in DE 196 08 478 A1 to which reference is herewith expressly made. The respective wheel-mounted electronic unit sends out for this purpose, as part of its data telegram, an identification signal characteristic of the respective wheel-mounted electronic unit 3. In order to permit the evaluation and control unit 8 to evaluate the intensities of the signals received, it is necessary to transmit, together with the data telegram transmitted via the BUS 17, some additional information regarding the intensity of the signal received by the respective receiving antenna 4, for example some information regarding the signal field strength received. This information is also described by the abbreviation RSSI in technical terminology (Received Signal Strength Indicator=measure of the received field strength). This can be achieved in different ways:

An analog signal having a strength proportional to the RSSI level of the signal transmitted by radio is produced in the single-channel RF receiver. For generating the analog signal, the signal received is, for example, fanned out and one branch is integrated by a capacitor. The voltage building up at the capacitor then provides a measure of the RSSI level received.

The analog signal can then be transmitted to the central evaluation and control unit via a line of BUS 17 as direct voltage or as a load-independent direct current.

On the other hand, the single-channel RF receiver 5 can be suitably designed to locally evaluate the RSSI level of the signals received by radio, to convert the RSSI level to a digital signal and to transmit that signal, together with the received digital signal that has been received and demodulated, to the central evaluation and control unit 8. Transmission of the digital RSSI signal can be effected either before or after the received demodulated digital signal.

When not all wheels 1 have assigned to them separate modules 20, but a separate module 20 is provided only for every two wheels 1 mounted on a common axle or for a four-wheel vehicle, then the signals can be allocated to the different wheel positions by an arrangement where one or two additional acceleration sensors are provided in the wheel-mounted electronic unit 3 by means of which information regarding the moving state of the respective wheel 1, such as the speed, the tangential acceleration and differences in the rolled distances, can be gained which clearly permit to differentiate between right wheels and left wheels and between front wheels and rear wheels. The manner in which this can be achieved has been disclosed in German Patent Applications Nos. 197 35 686.9, 198 56 861.4 and 100 12 458.5 to which express reference is herewith made for more technical details.

What is claimed is:

1. Arrangement on vehicles equipped with wheels with pneumatic tires, having an evaluation and control unit arranged in the vehicle and one or more receiving antennas, that are assigned to individual wheels or groups of wheels of the vehicle and are connected to the evaluation and control unit via an RF receiver comprising a demodulator, for use in a tire-pressure monitoring system in which a unit, that is mounted on the respective wheel and that comprises a pressure sensor for measuring the pressure in the pneumatic tire and for generating an electric pressure-measurement signal, a control circuit and a transmitter with a sending antenna for sending out, under the control of the control circuit, the pressure-measuring signal or a signal derived therefrom in the form of a radio-frequency signal, wherein each receiving antenna has assigned to it a separate RF receiver in combination with a demodulator, a circuit arrangement for the generation of a digital electric identification signal characteristic of the mounting location of the respective receiving antenna, and a BUS interface, wherein the evaluation and control unit comprises a BUS interface, that the two BUS interfaces are connected one to the other by a BUS, for which purpose a plug-in connector is provided which is connected to the BUS by a first connector element and to the BUS interface of the RF receiver by a second connector element, and that the first connector element of the plug-in connector is designed so as to provide an identifier and to supply it to the circuit arrangement provided on the side of the RF receiver, through its connection to the second connector element, for the generation of the digital electric identification signal characteristic of the identifier of the first connector element.

2. The arrangement as defined in claim 1, wherein each receiving antenna and its associated RF receiver with demodulator, the circuit arrangement for the generation of the identification signal and the BUS interface are combined to one module.

3. The arrangement as defined in claim 1, wherein the RF receivers with demodulator and the circuit arrangement for the generation of the identification signal are connected to the wiring of the motor vehicle via the BUS interface.

4. The arrangement as defined in claim 1, wherein each wheel of the vehicle has associated to it a separate receiving antenna arranged in its neighborhood.

5. The arrangement as defined in claim 1, wherein a common receiving antenna is assigned to the wheels mounted on a common axle of the vehicle.

6. The arrangement as defined in claim 1, wherein in the case of trailers with wheels, having likewise one or more receiving antennas for monitoring the tire pressure of their wheels, with an RF receiver in combination with a demodulator, a circuit arrangement for the generation of a characteristic identification signal and a BUS interface associated to each antenna, an additional plug-in connector is provided in the BUS system between the vehicle and its trailer for connecting the BUS interface of the trailer to the BUS in the vehicle.

7. The arrangement as defined in claim 1, wherein modules, consisting of the receiving antenna, the RF receiver, the demodulator, the circuit arrangement for the generation of identification signals, and the BUS interface, are identical one to the other.

8. The arrangement as defined in claim 1, wherein the two elements of the plug-in connector each comprise, for providing said identifier, a plurality of additional contact pairs, each consisting of a contact pin and a matching contact jack, with at least one of the additional contact pins or contact jacks of the first connector element of the plug-in connector being connected to ground and another one of the contact pins or contact jacks being connected to a line of the vehicle wiring carrying a voltage over ground, and that the selection and pole-connection of those contact pins or contact jacks is different for each possible mounting location of receiving antennas envisaged, but remains equal for all vehicles of one model family.

9. The arrangement as defined in claim 1, wherein the plug-in connector consists of a plug arranged on the BUS and of a coupler arranged on the BUS interface associated to the receiving antenna.

10. The arrangement as defined in claim 9, wherein the coupler is fixed on a housing that contains the RF receiver with the demodulator, the circuit arrangement for the generation of identification signals and the BUS interface.

11. Arrangement on vehicles equipped with wheels with pneumatic tires, having an evaluation and control unit arranged in the vehicle and one or more receiving antennas, that are assigned to individual wheels or groups of wheels of the vehicle and are connected to the evaluation and control unit via an RF receiver comprising a demodulator, for use in a tire-pressure monitoring system in which a unit, that is mounted on the respective wheel and that comprises a pressure sensor for measuring the pressure in the pneumatic tire and for generating an electric pressure-measurement signal, a control circuit and a transmitter with a sending antenna for sending out, under the control of the control circuit, the pressure-measuring signal or a signal derived therefrom in the form of a radio-frequency signal, wherein each receiving antenna has assigned to it a separate RF receiver in combination with a demodulator, a circuit arrangement for the generation of a digital electric identification signal characteristic of the mounting location of the respective receiving antenna, and a BUS interface, wherein the evaluation and control unit comprises a BUS interface, that the two BUS interfaces are connected one to the other by a BUS, for which purpose a plug-in connector is provided which is connected to the BUS by a first connector element and to the BUS interface of the RF receiver by a second connector element, and that the first connector element of the plug-in connector is designed so as to provide an identifier and to supply it to the circuit arrangement provided on the side of the RF receiver, through its connection to the second connector element, for the generation of the digital electric identification signal characteristic of the identifier of the first connector element, wherein the BUS is part of a cable harness on which the first connector elements for the different mounting locations of the receiving antennas are mounted.

12. The arrangement as defined in claim 1, wherein said identifier is an electrical identifier.

13. Arrangement on vehicles equipped with wheels with pneumatic tires, having an evaluation and control unit arranged in the vehicle and one or more receiving antennas, that are assigned to individual wheels or groups of wheels of the vehicle and are connected to the evaluation and control unit via an RF receiver comprising a demodulator, for use in a tire-pressure monitoring system in which a unit, that is mounted on the respective wheel and that comprises a pressure sensor for measuring the pressure in the pneumatic tire and for generating an electric pressure-measurement signal, a control circuit and a transmitter with a sending antenna for sending out, under the control of the control circuit, the pressure-measuring signal or a signal derived therefrom in the form of a radio-frequency signal, wherein each receiving antenna has assigned to it a separate RF receiver in combination with a demodulator, a circuit arrangement for the generation of a digital electric identification signal characteristic of the mounting location of the respective receiving antenna, and a BUS interface, wherein the evaluation and control unit comprises a BUS interface, that the two BUS interfaces are connected one to the other by a BUS, for which purpose a plug-in connector is provided which is connected to the BUS by a first connector element and to the BUS interface of the RF receiver by a second connector element, and that the first connector element of the plug-in connector is designed so as to provide an identifier and to supply it to the circuit arrangement provided on the side of the RF receiver, through its connection to the second connector element, for the generation of the digital electric identification signal characteristic of the identifier of the first connector element, wherein said identifier is an electromechanical identifier.

14. The arrangement as defined in claim 8, wherein said identifier is an electrical identifier.

15. The arrangement as defined in claim 8, wherein said identifier is an electromechanical identifier.

* * * * *